March 31, 1970 M. K. VOSBURY ET AL 3,504,360

LOGIC CIRCUIT PRODUCING AN ANALOG SIGNAL CORRESPONDING TO AN ADDITIVE COMBINATION OF DIGITAL SIGNALS

Filed June 27, 1966 2 Sheets-Sheet 1

INVENTORS

MICHAEL K. VOSBURY

EVERETT M. KITTREDGE

BY

ATTORNEY

INVENTORS
MICHAEL K. VOSBURY
EVERETT M. KITTREDGE
BY
ATTORNEY

United States Patent Office 3,504,360

Patented Mar. 31, 1970

3,504,360

LOGIC CIRCUIT PRODUCING AN ANALOG SIGNAL CORRESPONDING TO AN ADDITIVE COMBINATION OF DIGITAL SIGNALS

Michael K. Vosbury and Everett M. Kittredge, Nashua, N.H., assignors to Sanders Associates, Inc., Nashua, N.H., a corporation of Delaware Filed June 27, 1966, Ser. No. 560,657

Int. Cl. H03k *13/04*

U.S. Cl. 340—347 9 Claims

ABSTRACT OF THE DISCLOSURE

An electrical circuit is shown that produces an analog voltage corresponding to the sum or the difference of two or more digital signals. The circuit additively combines all the equal-weight digits in the signals being added in a manner that produces a combined analog voltage for each digit position. The circuit then sums the weighted functions of these analog voltages for the different digit positions to produce an analog signal that corresponds to a selected additive combination of all the digital signals.

This invention relates to an electrical circuit that produces an analog voltage corresponding to the sum or the difference of two or more digital signals. The circuit additively combines all the equal-weight digits in the signals being added in a manner that produces a combined analog voltage for each digit position. It then sums weighted functions of these analog voltages for the different digit positions to produce an analog signal that corresponds to a selected additive combination of all the digital signals.

The circuit can operate with digital numbers having essentially any radix. Hence, it can process binary, ternary and octal signals, binary-coded decimal signals, and other coded digital signals. Further, it can additively combine essentially any number of digital signals.

Another feature of the circuit is that the analog output voltage can be either the sum or the difference of the digital input signals, and it can be either a direct voltage having a selected zero value, or it can be a time-varying function of the input digital signals.

As used herein, the term "additively combine" covers both addition and subtraction. The arithmetic result of this generic operation is referred to as the "additive combination" or simply as the "combination."

Most numbers, including conventional decimal numbers, are written in the positional notation system. In this system, an $(n)$-digit number having a radix $r$ is expressed as $$a_1r^{n-1}+a_2r^{n-2}+a_3r^{n-3}+ \dots +a_nr^0 \qquad (1)$$

where each coefficient $(a)$ is an integer between zero and $(r-1)$. This form is not generally used; the number is usually written as $(a_1a_2a_3 \dots a_n)$.

Consider an electrical logic device operating in the binary number system where $r=2$. A 1-volt level at a first pair of terminals, a 0-volt level at a second pair of terminals and 1-volt levels at third and fourth pairs of terminals constitute a four-digit binary signal identifying the binary number 1011. The leftmost digit in this number, identified by the voltage at the first pair of terminals, is the most significant digit, and hence has the largest weight; digits successively to the right have lesser significance.

When written with the full positioned notation, this binary number 1011 appears as $$1(2^3)+0(2^2)+1(2^1)+1(2^0)$$

which identifies the quantity 8+0+2+1, or 11 in decimal notation.

Conventionally, addition of electrical digital signals identifying numbers to produce an electrical signal whose amplitude is the analog of the sum of the numbers is accomplished by either (1) adding the signals on a digital basis and converting the digital sum to an analog signal, or (2) converting each digital signal to an analog signal and adding the resultant analog signals. The first method requires a digital adder and a digital-to-analog converter. The second mehtod requires two digital-to-analog converters plus an analog adder. These separate circuits for performing the combining and analog converting operations require a considerable number of parts and are fairly costly.

Accordingly, it is an object of the present invention to provide an improved electrical circuit for producing an analog signal with an amplitude corresponding to an additive combination of a plurality of digital signals.

Another object is to provide a circuit of the foregoing type characterized by manufacture at a relatively low cost.

A further object is to provide such a circuit that is simpler than prior circuits for the same purpose.

Another object is to provide such a circuit that requires fewer components than prior circuits.

It is also an object of the invention to provide a circuit of the above character that operates with high speed and high accuracy.

Another object of the invention is to provide a circuit of the above character that can operate with digital signals having essentially any radix and with essentially any number of digital signals.

It is also an object of the invention to provide a circuit of the above character that can either add or subtract the digital signals and, further, that can provide either an analog direct voltage or an analog voltage that is a selected function of time.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

As indicated above, in additively combining multiple-digit digital signals, the present circuit combines the equal-weight digits of all the signals and produces the analog resultants, as distinguished from producing the digital resultants. To illustrate this distinction, consider binary digital numbers, i.e., digital numbers with a radix of 2. The sum of a binary 1 and a binary 1 is a binary 0 with a 1 carried to the next most significant digit position. On the other hand, 2 is the analog sum of two binary 1's and no carry is involved. Thus, the addition of equal-weight binary digits in a manner that produces their analog sum, as contrasted to producing their binary sum and then converting that to an analog quantity, eliminates the need for handling carry operations.

Next, the circuit applies to its output terminal the algebraic sum of weighted functions of all the analog voltages thus produced for all the digit positions in the input signals. The weighting function for each digit in the sum accounts for the radix of the input signals and for the position of that digit in the input signals.

Figure 1:
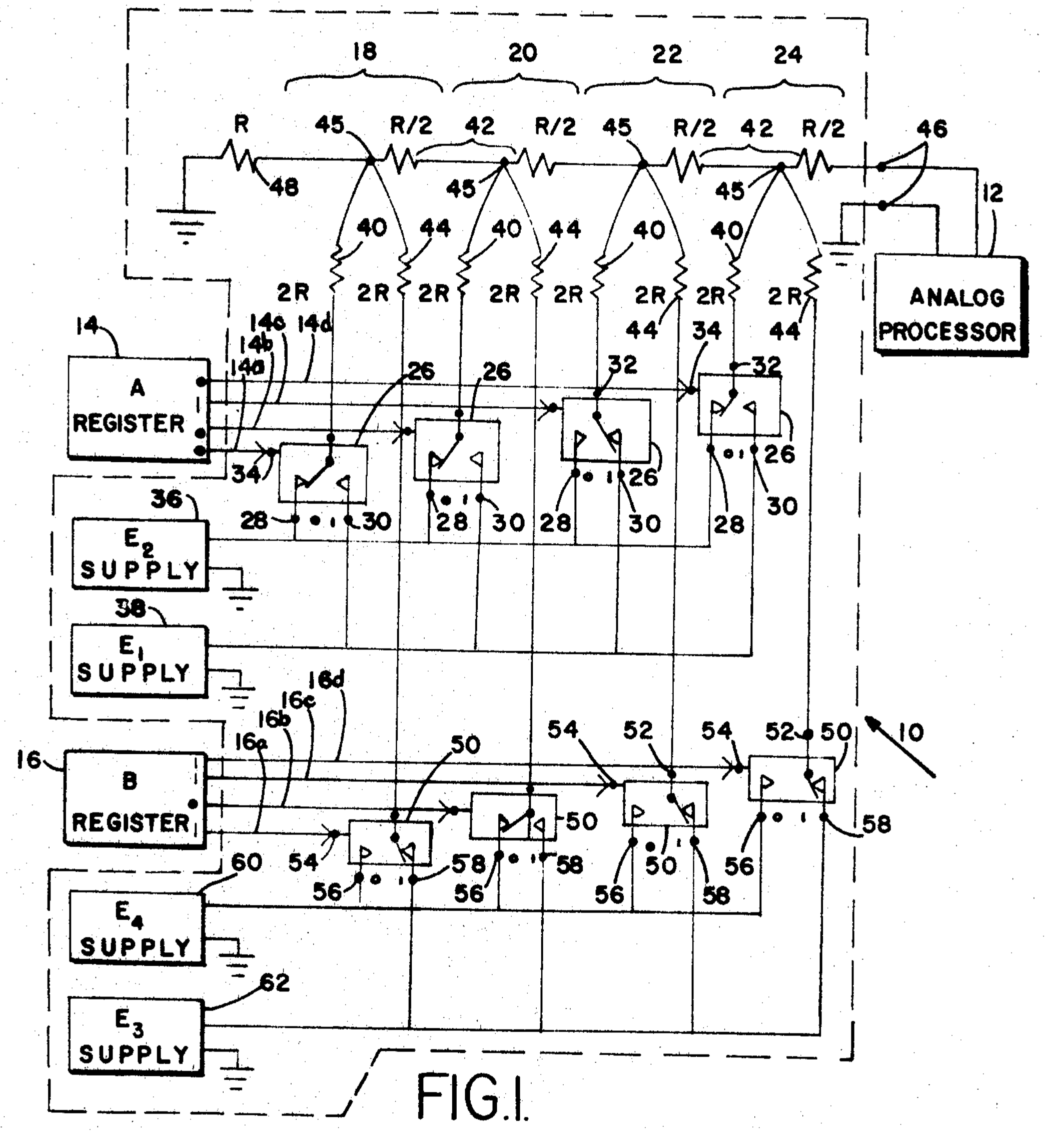
FIG. 1 shows a circuit embodying the invention for producing an analog voltage that is the additive combination of two four-digit binary signals.

More particularly, turning to FIG. 1, a ladder-type circuit indicated generally at 10 delivers to an analog processor 12 the additive combination of the four-digit parallel binary signal from an A-register 14 and the four-digit parallel binary signal from a B-register 16. The output lines **14*a* and 16*a* from the registers 14 and 16, respectively, carry the least significant digits of the contents of the two registers, and the next lines 14*b* and 16*b* carry the next-to-the-least significant digits. Similarly, the register output lines 14*c* and 16*c* carry the next-to-the-most significant digits of the register contents, and the most significant digits of the two binary signals are carried on the output lines 14*d* and 16*d***.

The circuit 10 has a separate stage 18, 20, 22 and 24 for each of the four digit positions in the input binary signals, and each stage is associated with one digit position. The stages are identical.

Associated with the A-register 14, each stage 18, 20, 22 and 24 has a two-position switch 26. Each switch applies one of two selected reference voltages, applied to ONE and ZERO reference terminals 30 and 28, respectively, to an output terminal 32 in accordance with the value of the binary signal received at an input control terminal 34. The switch control terminal is connected with one A-register line **14*a*, 14*b*, 14*c* and 14*d*** to receive the digital signal for the digit position assigned to the stage.

An $E_1$ reference supply 38 provides the reference voltage for the ONE reference terminal 30 for each of four switches 26 in the stages 18–24, and an $E_2$ reference supply 36 provides the reference voltage for the ZERO reference terminals 28.

Each switch output terminal 32 connects to a shunt-resistor 40, connected at its other end to a series resistor 42 and to another shunt resistor 44. The node terminal 45 where these three resistors interconnect also connects to the other end of the series resistor 42 in the succeeding lower-significance stage. At the output terminals 46 of the circuit 10, the series resistor 42 in the most significant stage 24 connects to the input of the analog processor 12. In addiion, an end resistor 48 is connected between ground and the node terminal 45 in the least significant stage 18.

In the binary ladder-type circuit 10, the resistors have the illustrated values, that is, the series resistor 42 in each stage has a resistance (R/2), each shunt resistor 40 and 44 has a resistance of (2R), and the end resistor 48 has a resistance of (R).

With further reference to FIG. 1, each stage 18–24 of the circuit 10 has a second switch 50, the output terminal 52 of which connects to the end of the shunt resistor 44 remote from the node terminal 45. Each switch 50, preferably identical to the switches 26, has a control terminal 54 connected to the associated line from the B-register 16 and has ONE and ZERO reference terminals 58 and 56 connected respectively to an $E_3$ reference supply 62 and to an $E_4$ reference supply 60. The internal resistance of each reference supply 36, 38, 60 and 62 is relatively small or included in the shunt resistor in series with it.

Although illustrated as mechanical switches, the switches 26 and 50 are preferably electronic; each switch can be a single-transistor circuit that normally clamps its output terminal to a ZERO level signal and changes it to a ONE level signal in response to a ONE input signal.

Consider the operation of the circuit in FIG. 1 with a signal from the A-register 14 of 0100, which is the binary representation of the decimal numeral 4, and with a signal from the B-register 16 of 1101, corresponding to the decimal numeral 13. Assume further that it is desired to add these two numbers, that the analog processor has an internal resistance of (R/2), that the output voltages of the $E_2$ reference supply 36 and of the $E_4$ reference supply 60 are zero, and that the output voltages of the $E_1$ and $E_3$ reference supplies 38 and 62 are each one volt. Under these conditions, in the least significant stage 18 the switch 26 receives a ZERO signal at its input terminal 34, and in response applies the zero-volt reference voltage from its terminal 28 to its output terminal 32. The switch 50 in stage 18 receives a signal corresponding to a binary ONE from the B-register 16, and in response applies the one-volt reference voltage from its terminal 58 to its output terminal 52. The voltage at the stage 18 node terminal 45 accordingly increases by one-sixth volt.

In the stage 20 of the circuit 10, both the switch 26 and the switch 50 receive signals corresponding to binary ZEROS. Accordingly, the binary input digits in the third-most significant digit position do not increase the voltage at the node 45 in the corresponding stage 20.

On the other hand, in stage 22, both the switch 26 and the switch 50 receive signals corresponding to binary ONES. Accordingly, the switch 26 output terminal 32 receives the one-volt reference voltages from the $E_1$ reference supply, and the switch 50 output terminal 52 receives the one-volt reference voltage from the $E_3$ supply. This increases the voltage at the node terminal 45 in the stage 22 by one-third volt.

Finally, in the most significant digit stage 24, the switch 26 receives a binary ZERO signal, and the switch 50 receives a binary ONE signal, so that the voltage at the node terminal 45 therein increases by one-sixth volt.

By conventional techniques for analyzing ladder circuits, it can be shown that these voltages at the four node terminals 45 produce one-third of a (17/32)-volt signal across the output terminals 46. The factor of (1/3) results from the resistance of the analog processor 12, for the open circuit output voltage is 17/32 volt. This quantity is the decimal sum (17) of the two input digital signals divided by $2(r)^n$(i.e., by 32), where ($r$) is the binary radix 2 and ($n$) is the number of digits in the input signals, i.e., 4. This factor is independent of the value of the input signals, and the processor 12 readily accounts for it. Thus, the circuit indeed develops the analog of the sum of the input digital signals.

Figure 2:
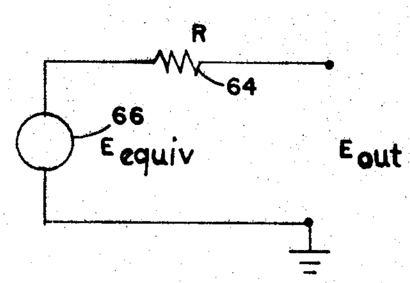
FIG. 2 shows the Thevenin equivalent of the circuit of FIG. 1.

FIG. 2 shows the Thevenin equivalent of the circuit 10 of FIG. 1. The FIG. 1 ladder network of resistors 40, 42, 44 and 48 reduces to an equivalent resistor 64 having a value of (R). The voltage source 66 in the equivalent circuit develops an open circuit voltage $E_{equiv}$, equal to the total voltage the FIG. 1 reference supplies 36, 38, 60 and 62 apply to the output terminals 46 when no load is connected. This voltage is $$E_{equiv}=\frac{AE_1+(1-A)E_2+BE_3+(1-B)E_4}{2} \qquad (2)$$

where $E_{equiv}$ is the open circuit output voltage of the equivalent source 66;

A is a binary fraction equal to $$\frac{a_1 2^{n-1}+a_2 2^{n-2}+a_3 2^{n-3}+\ldots a_{n-1}2^1+a_n 2^0}{2n} \qquad (3)$$

where $a_1$, $a_2$, $a_3$, . . . $a_{n-1}$ and $a_n$ are the coefficients (either 0 or 1) of the $n$-place binary number in the A-register 14;

B is a binary fraction equal to $$\frac{b_1 2^{n-1}+b_2 2^{n-2}+b_3 2^{n-3}+\ldots b_{n-1}2^1+b_n 2^0}{2n} \qquad (4)$$

where $b_1$, $b_2$, $b_3$, . . . $b_{n-1}$ and $b_n$ are the coefficients of the $n$-place binary number from the B-register 16; and $E_1$, $E_2$, $E_3$, $E_4$, respectively, represents the open circuit voltages output from the reference supplies 38, 36, 62, and 60.

By way of illustration in applying the equivalent circuit of FIG. 2, consider again the foregoing example where the FIG. 1 A-register 14 contains the binary number 0100 and the B-register 16 contains the binary number 1101, and, further, where $E_1=E_3=1$ volt and $E_2=E_4=0$ volt. Eq. 3 then has the value $$A=\frac{0(2^3)+1(2^2)+0(2^1)+0(2^0)}{2^4}=\frac{4}{16} \qquad (5)$$

and Eq. 4 has the value $$B=\frac{1(2^3)+1(2^2)+0(2^1)+1(2^0)}{2^4}=\frac{13}{16} \qquad (6)$$

Applying these value of the reference voltages and of A and B to Eq. 2 gives the following value for the FIG. 2 equivalent source 66

$$E_{\text{equiv}}=\frac{(4/16)1+0+(13/16)1+0}{2}=\frac{17}{32} \qquad (7)$$

This is the same open circuit output voltage calculated above for the circuit 10 of FIG. 1.

With further reference to FIG. 2, Table I below shows the value of $E_{\text{equiv}}$ for some of the more useful different values of the reference supplies 36, 38, 60 and 62 of FIG. 1. The terms A and B in the table are the binary fractions defined in Eqs. 3 and 4, respectively. The condition I listed in Table I is the condition under which the foregoing example was calculated, both with the complete circuit of FIG. 1 and with the equivalent circuit in FIG. 2.

TABLE I

| Condition No. | Reference voltages | $E_{quiv}$ |
|---|---|---|
| I | $E_1=E_3=1$; $E_2=E_4=0$ | $\frac{1}{2}(A+B)$ |
| II | $E_1=E_3=-1$; $E_2=E_4=1$ | $1-(A+B)$ |
| III | $E_1=E_4=1$; $E_2=E_3=0$ | $\frac{1}{2}+\frac{1}{2}(A-B)$ |
| IV | $E_1=E_4=1$; $E_2=E_3=-1$ | $A-B$ |
| V | $E_2=E_4=0$; $E_1=1$; $E_3=-1$ | $\frac{1}{2}(A-B)$ |
| VI | $E_2=E_4=0$; $E_1=1-f(t)$; $E_3=f(t)$ | $\frac{A[1-f(t)]+B\,f(t)}{2}$ |
| VII | $E_1=1$; $E_2=f(t)$; $E_3=0$; $E_4=-f(t)$ | $\frac{A[1-f(t)]+B\,f(t)}{2}$ |

With reference to Table I and FIG. 1, to apply 1 minus the sum of the two binary fractions from the registers 14 and 16 to the analog processor 12, the reference supplies should have the output voltages indicated in condition II.

When the output voltages of the $E_2$ reference supply 36 and the $E_3$ reference supply 62 are both equal to zero and the output voltages from the other two reference supplies 38 and 60 are equal to +1 volt, as listed under condition III, the circuit 10 develops an open circuit output voltage equal to one-half the quantity $(A-B)$ superimposed on a one-half volt level.

When the reference supplies have the output voltages listed in Table I under condition IV, the one-half factor and the one-half volt offset of condition III are removed, and the analog processor 12 receives a voltage corresponding to the difference between the two binary inputs.

When the reference supplies have the opposite output voltages from those listed for condition IV, that is, when $E_1$ and $E_4$ both equal −1 volt and when $E_2$ and $E_3$ both equal +1 volt, the output voltage from the circuit 10 is again equal to the difference between the two binary inputs, but the order of the subtraction is reversed.

Further, condition V in Table I illustrates the use of three different input reference voltages in the circuit 10.

With further reference to Table I, conditions VI and VII illustrate the operation of the circuit 10 with reference voltages that are functions of time. In particular, these two conditions illustrate two different sets of reference voltages that produce the same result. This resultant voltage has a particularly useful characteristic when the time function $f(t)$ is an increasing ramp voltage, that is, a voltage that linearly increases from a zero level to a one-volt level in a time $t_1$. In that instance, the output voltage from the FIG. 1 circuit 10 changes from the value of the binary fraction A to the value of binary fraction B in the interval $t_1$. Such an output voltage is useful, for example, to produce a cathode ray tube display of a straight line connecting a first coordinate identified by the binary fraction A with a second coordinate identified with the binary fraction B.

Figure 3:
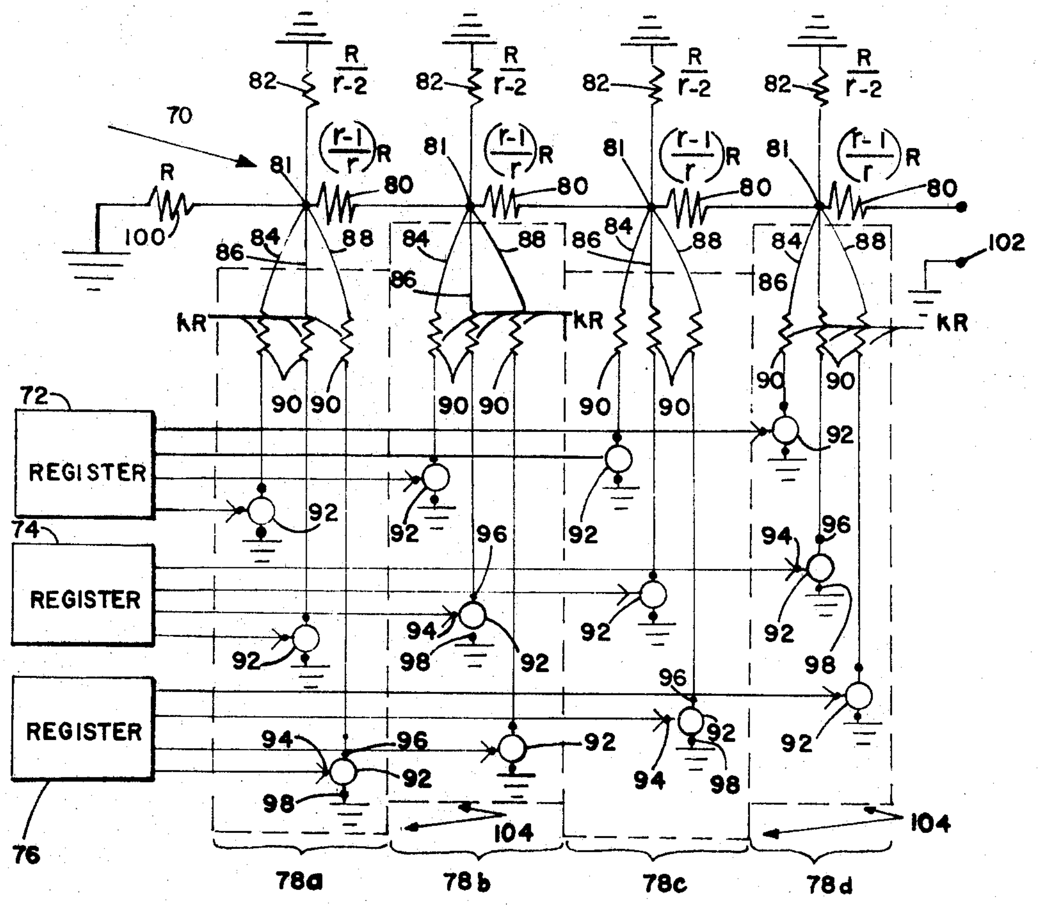
FIG. 3 shows a generalized circuit for adding three four-digit signals having a radix $r$ in accordance with the invention.

The circuit 10 of FIG. 1 is a specific example of a generalized circuit that develops an analog voltage corresponding to the additive combination of any number $(k)$ of $(n)$-place digital signals all having the same radix. FIG. 3 shows such a generalized circuit 70 for additively combining three four-place numbers of a radix $(r)$. Thus, for the circuit 70, $(k=3)$ and $(n=4)$. Registers 72, 74 and 76 apply the digital signals to the circuit.

In brief, the generalized circuit 70 converts every digit of each input signal to a corresponding analog voltage and algebraically sums all the analog voltages for each digit position. Further, the circuit algebraically sums a weighted portion of each of the $(n)$ resultant analog voltages to produce the analog output voltage. The weighting factor accounts for the digit position associated with each resultant analog voltage and also accounts for the radix of the input digital signals.

More particularly, the circuit 70 in FIG. 3 is a ladder network having four identical stages **78*a*, 78*b*, 78*c* and 78*d*, one for each of the $(n)$ digit positions in the input digital signals. The leftmost stage 78*a* is associated with the least significant digit, the next two stages 78*b* and 78*c* are associated successively with the next two higher significance digits, and the rightmost stage 78*d* is associated with the most significant digit. Each stage 78 has a series resistor 80 connected from a node terminal 81 to the series resistor in the next higher significance stage. A shunt resistor 82 is connected between ground and the node terminal. Each stage 78 also has (k) shunt paths 84, 86 and 88, each comprising a resistor 90 in series with a voltage source 92**.

Each voltage source 92 is an $r$-nary (e.g., binary when $r=2$, ternary when $r=3$, and decimal when $r=10$) source having an input control terminal 94, an output terminal 96 and a reference terminal 98. The source develops at its output terminal 96 a voltage corresponding to the analog value of the digital signal applied to its control terminal 94, which is connected to one of the registers 72, 74, 76 as shown. FIG. 1 shows an example of such a voltage source 92 for binary input signals. In that embodiment of the invention each FIG. 3 source 92 includes one of the two switches 26 and 50 and the pair of supplies 36 and 38 or 60 and 62, respectively, connected to it.

With further reference to FIG. 3, the resistors in each stage 78 of the generalized circuit 70 have the following values relative to the resistance (R) of an end resistor 100 connected between ground and the node terminal 81 in the least significant stage **78*a*. Each series resistor 80** has a resistance equal to $$\left[\left(\frac{r-1}{r}\right)R\right]$$

and each shunt resistor 82 has a resistance of $$\left(\frac{R}{r-2}\right)$$

(When $r=2$, the resistor 82 has an infinite value, and the circuit 70 reduces to the form shown in FIG. 1.) Further, each resistor 90 in the shunt paths 84, 86 and 88 has a resistance equal to $(kR)$.

The circuit 70 operates as follows in adding ternary numbers (i.e., $r=3$) with voltage sources 92, each of which develops an output voltage of 0 volt, 1 volt or 2 volts depending on the input digit it receives from the register connected to it. Assume that the register 76 develops a ternary signal of 0121, which is a shorthand way of writing the number $$[0(3^3)+1(3^2)+2(3^1)+1(3^0)]$$

The most significant digit 0 is applied to the input terminal 94 of one source 92 in the stage **78*d* and causes that source to develop 0 volt at its output terminal 96. This adds nothing to the voltage at the node terminal 81 of stage 78***d*. The next most significant digit 1 causes a source 92 in the stage 78*c* to apply one volt to the resistor 90 in series with it, with a corresponding contribution to the voltage at the node terminal 81 of the stage. The third most significant digit output from the register 76, i.e., the ternary digit 2, is applied to the control terminal of a source 92 in the stage 78*b*. In response, that source produces a two-volt output signal, which contributes correspondingly to the voltage at that stage node terminal 81. The least significant digit 1 from the register 76 similarly causes a source 92 in stage 78*a* to develop a one-volt output signal, producing a corresponding contribution to the voltage at the stage's node terminal 81.

The non-zero ternary signals from the other registers 72 and 74 likewise augment the voltage levels at the node terminals. The resultant voltage developed at each node terminal is the algebraic sum of the analog voltages identified by the three equal-significance digits that the stage of circuit 70 receives from the three registers. The circuit 70 algebraically adds $[(r)^{-p}]$ times each of these node terminal voltages to develop at the output terminal 102 an analog voltage whose amplitude corresponds to the sum of the input digital signals. The number $(p)$ in the weighting factor $[(r)^{-p}]$ is the digit position with which each stage is associated. It is equal to (0) for the most significant stage 78*d*, and is (1) for the next stage 78*c*.

With further reference to FIG. 3, the sources 92 can be arranged to additively combine the digital signals from the registers 72, 74 and 76 in different ways in the same manner described above with reference to Table I and FIGS. 1 and 2.

Figure 4:
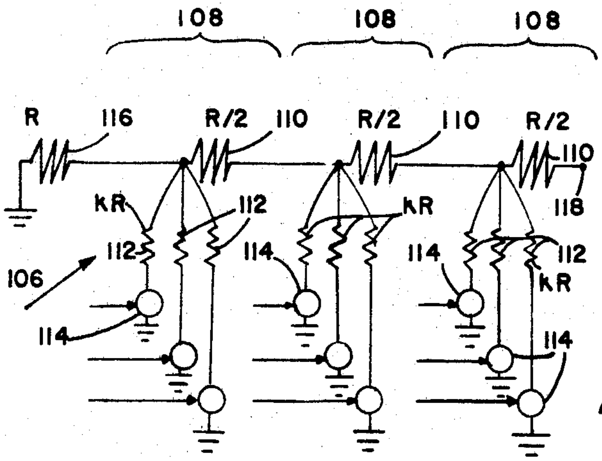
FIG. 4 shows a binary ladder network for use with the circuit of FIG. 3.

Moreover, when the input digital signals are binary coded, $(m)$-place $r$-nary signals, such as 3-digit binary-coded-decimal signals, each set 104 of $(k)$ branches 84–88 in each stage 78 is replaced by a binary ladder 106 shown in FIG. 4. The ladder 106 has a standard binary configuration and has $(m)$ stages 108, each comprising a series resistor 110 and $(k)$ shunt paths, each of which comprises a shunt resistor 112 in series with a binary source 114. The binary ladder 106 also has an end resistor 116 connected between ground and the series resistor 110 in the stage 108 associated with the least significant digit position. The resistance of the end resistor 116 is equal to (R), the same resistance as the end resistor 100 in the circuit 70 of FIG. 3. Each series resistor 110 has a resistance of (R/2), and each shunt resistor 112 has a resistance of $(k\text{R})$. The output terminal 118 of the ladder network 106 is connected to the FIG. 3 circuit 70 at the node terminal 81 in the stage 78 whose set 104 of branches the ladder network 106 replaces.

Each binary source 114 in each stage of the ladder network 106 receives as an input signal one digit of one binary-coded $r$-nary signal that the FIG. 3 circuit 70 is to additively combine with other digital signals. For example, with binary-coded decimal signals, the three sources 114 in the rightmost stage 108 of the FIG. 4 ladder network 106 receive the most significant binary digit of each of the three binary-coded decimal signals.

In summary, the present circuit for producing an analog signal corresponding to an additive combination of $n$-place digital signals comprises a series succession of $(n)$ stages. Each stage receives the same-weight digits in all the input signals, and produces an analog voltage equal to a selected additive combination of these same-weight digits. Weighted portions of these voltages from the different stages are then algebraically summed to produce the desired analog output signal.

By directly combining the same-weight digits of all the input signals in a manner that produces an analog voltage, and only then combining the different-weight digits, the circuit provides economies in the circuit complexity and hence in manufacturing cost.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A logic circuit for producing at first terminal means an analog signal corresponding to an additive combination of $(k)$ binary coded digital input signals each of which consists of $(n)$ groups of $(m)$ binary digits identifying $(n)$ $r$-nary digits, said circuit comprising (A) a common return conductor, (B) a network having $(n)$ cascaded stages, each stage being associated with a different digit position in said digital input singals and comprising (1) $(n)$ node terminals, (2) $(k)$ source means (a) each of which is arranged to receive a different group of $(m)$ binary digits identifying one $r$-nary digit in the associated digit position and to produce, in response thereto, an analog voltage corresponding to the value of said $r$-nary digit, and (b) arranged to apply between said common conductor and said node terminal in the same stage a first analog voltage that is the selected function of the sum of said $(k)$ analog voltages, and (3) circuit means interconnecting said stages and applying to said first terminal means the sum of weighted functions of said first voltages, and (C) (n) first shunt resistors each of which is connected between a different node terminal and said common return conductor.

2. A logic circuit according to claim 1 wherein said (k) source means in each stage comprise (A) an ordered $(m)$ substage binary ladder circuit each substage of which comprises (1) a series resistor having first and second ends, (a) said series resistor in the highest order substage of said binary ladder circuit being connected at its second end to said node terminal in the same stage, (b) each series resistor in the other substages being connected at its second end to the first end of the series resistor in the next higher-order substage, (2) $(k)$ second shunt resistors, and (3) $(k)$ binary voltage sources, (a) each binary voltage source having an input terminal and a pair of output terminals, (b) said output terminals of each said $(k)$ binary voltage sources being in series with a different one of said $(k)$ second shunt resistors between said first end of said series resistor in the same substage and said common return conductor, and (B) an end resistor connected between said common return conductor and said first end of said series resistor in the lowest order substage.

3. A logic circuit for producing between a first terminal and a common return conductor an analog voltage corresponding to an additive combination of $(k)$ binary coded digital input signals each of which consists of $(nm)$ binary digits identifying $(n)$ $r$-nary digits, said circuit comprising (A) a first end resistor connected at one end to said common return conductor,
(B) ($n$) first series resistors
(1) in series with each other between the other end of said first end resistor and said first terminal,
(2) successively ordered with the one connected to said first terminal having the highest order, and
(3) each of which has a first node terminal at the end thereof connected to the next lower-order first series resistor,
(C) ($n$) first shunt resistors each of which is connected between a different first node terminal and said common return conductor,
(D) ($n$) second end resistors each of which is connected at one end thereof to said common return conductor,
(E) ($n$) groups of ($m$) second series resistors,
(1) said ($m$) second series resistors in each group thereof being connected in series with each other between the other end of one second end resistor and one first node terminal,
(2) each second series resistor having a second node terminal at the end thereof distal from said first node terminal to which said group of second series resistors is connected,
(F) ($nm$) groups of ($k$) second shunt resistors, and
(G) ($nm$) groups of ($k$) binary voltage sources,
(1) each binary voltage source having a pair of output terminals and an input terminal and developing between said output terminals an analog voltage corresponding to the value of the binary signal applied to said input terminal thereof,
(2) each of ($k$) binary voltage sources having a different second shunt resistor in series with its output terminals between one second node terminal and said common return conductor, so that ($k$) series combinations of a second shunt resistor and a binary voltage source are connected between each second node terminal and said common return conductor.

4. A logic circuit according to claim 3 wherein
(A) each of said first and second end resistors has a resistance of R,
(B) each first series resistor has a resistance of $$\left(\frac{r-1}{r}\right)R$$

(C) each second series resistor has a resistance of (R/2),
(D) each first shunt resistor has a resistance of $$\left(\frac{R}{r-2}\right)$$

and
(E) each second shunt resistor has a resistance of ($k$R).

5. A logic circuit for producing between a first terminal and a common return conductor an analog voltage corresponding to an additive combination of ($k$) digital input signals, each input signal having no more than ($n$) digits ordered in a number system having a radix ($r$), said circuit comprising
(A) a first end resistor connected at one end thereof to said common return conductor,
(B) ($n$) series resistors
(1) in series with each other between the other end of said end resistor and said first terminal,
(2) successively ordered with the one connected to said first terminal having the highest order, and
(3) each of which has a node terminal at the end thereof connected to the next lower-order series resistor,
(C) ($n$) first shunt resistors each of which is connected between said common return conductor and a different node terminal,
(D) ($n$) groups of ($k$) second shunt resistors,
(E) ($n$) groups of ($k$) $r$-nary voltage sources,
(1) each voltage source having an input terminal and a pair of output terminals and developing between said output terminals an analog voltage corresponding to the value of the digital signal applied to said input terminal thereof,
(2) each of ($k$) $r$-nary voltage sources having its output terminals in series with a different second shunt resistor between one node terminal and said common return conductor, so that ($k$) series combinations of a second shunt resistor and a $r$-nary voltage source are connected between each node terminal and said common return conductor.

6. A logic circuit according to claim 5, wherein
(A) said end resistor has a resistance of R,
(B) each series resistor has a resistance of $$\left(\frac{r-1}{r}\right)R$$

(C) each first shunt resistor has a resistance of $$\left(\frac{R}{r-2}\right)$$

and
(D) each second shunt resistor has a resistance of ($k$R).

7. A logic circuit for producing at first terminal means an analog signal corresponding to an additive combination of ($k$) input signals, each of which consists of ($n$) groups of ($m$) digits identifying ($n$) $r$-nary digits in a number system, said circuit
(A) comprising ($n$) stages,
(B) each stage
(1) being associated with a different digit position in said number system,
(2) having ($k$) input terminal means each for receiving a group of ($m$) digits identifying one $r$-nary digit in the digit position that is associated with that stage,
(3) having an output terminal,
(4) comprising source means developing ($k$) analog signals each of which is responsive to, and corresponds to the value of a different group of said ($m$) digits, and
(5) developing at said output terminal a first signal corresponding to the algebraic sum of said ($k$) analog signals developed therein,
(C) said circuit being arranged to apply to said first terminal means an analog signal coresponding to the algebraic sum of ($r^{-p}$) times each first signal, where ($p$) is a positive integer corresponding to the order in said number system of the digit position associated with each first signal.

8. A logic circuit for producing between a first terminal and a common return conductor an analog voltage corresponding to an additive combination of ($k$) input signals, each input signal having no more than ($n$) digits ordered in a number system having a radix ($r$), said circuit comprising
(A) a first end resistor connected at one end thereof to said common return conductor,
(B) ($n$) series resistors
(1) in series with each other between the other end of said end resistor and said first terminal,
(2) successively ordered with the one connected to said first terminal having the highest order, and
(3) each of which has a node terminal at the end thereof connected to the next lower-order series resistor, (C) ($n$) first shunt resistors each of which is connected between said common return conductor and a different node terminal, and (D) ($n$) groups of ($k$) second shunt resistors adapted to receive said input signals.

9. A logic circuit according to claim 8, wherein (A) said end resistor has a resistance of R, (B) each series resistor has a resistance of $$\left(\frac{r-1}{r}\right)R$$

(C) each first shunt resistor has a resistance of $$\left(\frac{R}{r-2}\right)$$

and (D) each second shunt resistor has a resistance of ($k$R).

References Cited

UNITED STATES PATENTS

| | | | |
|---|---|---|---|
| 3,320,409 | 5/1967 | Larrowe | 235—150.5 |
| 2,603,746 | 7/1952 | Burkhart et al. | 328—96 |
| 2,827,233 | 3/1958 | Johnson et al. | 340—347 |
| 3,194,950 | 7/1965 | Walls et al. | 235—150.5 |
| 3,228,002 | 1/1966 | Reines | 307—243 |
| 3,303,464 | 2/1967 | Kolb | 235—175 |

OTHER REFERENCES

Analog to Digital Conversion Techniques, Alfred Susskind, 1957.

MAYNARD A. WILBUR, Primary Examiner

J. GLASSMAN, Assistant Examiner